(12) United States Patent
Camp et al.

(10) Patent No.: US 9,558,107 B2
(45) Date of Patent: Jan. 31, 2017

(54) EXTENDING USEFUL LIFE OF A NON-VOLATILE MEMORY BY HEALTH GRADING

(71) Applicant: INTERNATIONAL BUSINESS MACHINES CORPORATION, Armonk, NY (US)

(72) Inventors: Charles J. Camp, Sugar Land, TX (US); Ioannis Koltsidas, Zurich (CH); Nikolaos Papandreou, Thalwil (CH); Thomas Parnell, Zürich (CH); Roman A. Pletka, Zurich (CH); Charalampos Pozidis, Thalwil (CH); Gary A. Tressler, Sandy Hook, CT (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 14/139,925

(22) Filed: Dec. 24, 2013

(65) Prior Publication Data
US 2015/0177995 A1    Jun. 25, 2015

(51) Int. Cl.
*G06F 12/00* (2006.01)
*G06F 12/02* (2006.01)
(Continued)

(52) U.S. Cl.
CPC .............. *G06F 12/00* (2013.01); *G06F 3/0614* (2013.01); *G06F 3/0619* (2013.01);
(Continued)

(58) Field of Classification Search
None
See application file for complete search history.

(56) References Cited

U.S. PATENT DOCUMENTS

| 5,559,956 A | 9/1996 | Sukegawa |
| 5,905,993 A | 5/1999 | Shinohara |

(Continued)

FOREIGN PATENT DOCUMENTS

JP    5-282880 A    10/1993

OTHER PUBLICATIONS

International Business Machines Corporation (IBM), International Application No. PCT/JP2014/005371, International Filing Date: Oct. 22, 2014, International Search Report and Written Opinion dated Dec. 16, 2014.

(Continued)

*Primary Examiner* — Midys Rojas
(74) *Attorney, Agent, or Firm* — Brian F. Russell; Randall J. Bluestone

(57) ABSTRACT

In at least one embodiment, a controller of a non-volatile memory array determines, for each of a plurality of regions of physical memory in the memory array, an associated health grade among a plurality of health grades and records the associated health grade. The controller also establishes a mapping between access heat and the plurality of health grades. In response to a write request specifying an address, the controller selects a region of physical memory to service the write request from a pool of available regions of physical memory based on an access heat of the address and the mapping and writes data specified by the write request to the selected region of physical memory.

13 Claims, 9 Drawing Sheets

(51) Int. Cl.
  *G06F 3/06* (2006.01)
  *G06F 11/07* (2006.01)
  *G06F 11/10* (2006.01)
  *G06F 11/00* (2006.01)

(52) U.S. Cl.
  CPC .......... *G06F 3/0653* (2013.01); *G06F 11/008* (2013.01); *G06F 11/076* (2013.01); *G06F 11/0766* (2013.01); *G06F 11/0787* (2013.01); *G06F 11/1048* (2013.01); *G06F 11/1068* (2013.01); *G06F 12/0246* (2013.01)

(56) References Cited

U.S. PATENT DOCUMENTS

| | | |
|---|---|---|
| 8,296,620 B2 | 10/2012 | Chen et al. |
| 8,356,216 B2 | 1/2013 | Radke et al. |
| 9,075,705 B2 * | 7/2015 | Hikichi ................ G06F 11/004 |
| 2011/0041039 A1 | 2/2011 | Harari et al. |
| 2011/0238890 A1 | 9/2011 | Sukegawa |
| 2012/0226963 A1 | 9/2012 | Bivens et al. |
| 2012/0284587 A1 | 11/2012 | Yu et al. |
| 2012/0331207 A1 | 12/2012 | Lassa et al. |
| 2013/0111298 A1 | 5/2013 | Seroff et al. |
| 2015/0103593 A1 * | 4/2015 | Su ..................... G11C 16/3422 365/185.02 |

OTHER PUBLICATIONS

Jung, Dawoon et al., "A Group-Based Wear-Leveling Algorithm for Large-Capacity Flash Memory Storage Systems", CASES'07, Sep. 30-Oct. 3, 2007.
Choi, In-Hwan et al.,"Wear Leveling for PCM Using Hot Data Identification", Proceedings of the International Conference on IT Convergence and Security 2011. Springer Netherlands, 2012.
Grupp, Laura M. et al.,"Characterizing Flash Memory: Anomalies, Observations, and Applications", MICRO'09, Dec. 12-16, 2009.
Chang, Li-Pin,"On Efficient Wear Leveling for Large-Scale Flash-Memory Storage Systems", SAC'07, Mar. 11-15, 2007.
Hsieh, Jen-Wei et al., "Efficient Identification of Hot Data for Flash Memory Storage Systems", ACM Transactions on Storage, vol. 2, No. 1, pp. 22-40, Feb. 2006.
Chang, Yuan-Hao et al., "Endurance Enhancement of Flash-Memory Storage Systems: An Efcient Static Wear Leveling Design", DAC 2007, Jun. 4-8, 2007.
Hutsell, Woody et al., "Flash Solid-State Disk Reliability", TMS (Texas Memory Systems), Nov. 2008.
Qureshi, Moinuddin K. et al.,"Enhancing Lifetime and Security of PCM-Based Main Memory with Start-Gap Wear Leveling", MICRO'09, Dec. 12-16, 2009.
Hutsell, Woody,"An In-depth Look at the RamSan-500 Cached Flash Solid State Disk", TMS (Texas Memory Systems), Mar. 2008.
Hutsell, Woody,"An In-depth Look at the RamSan-620 Flash Solid State Disk", TMS (Texas Memory Systems), Jul. 2009.

\* cited by examiner

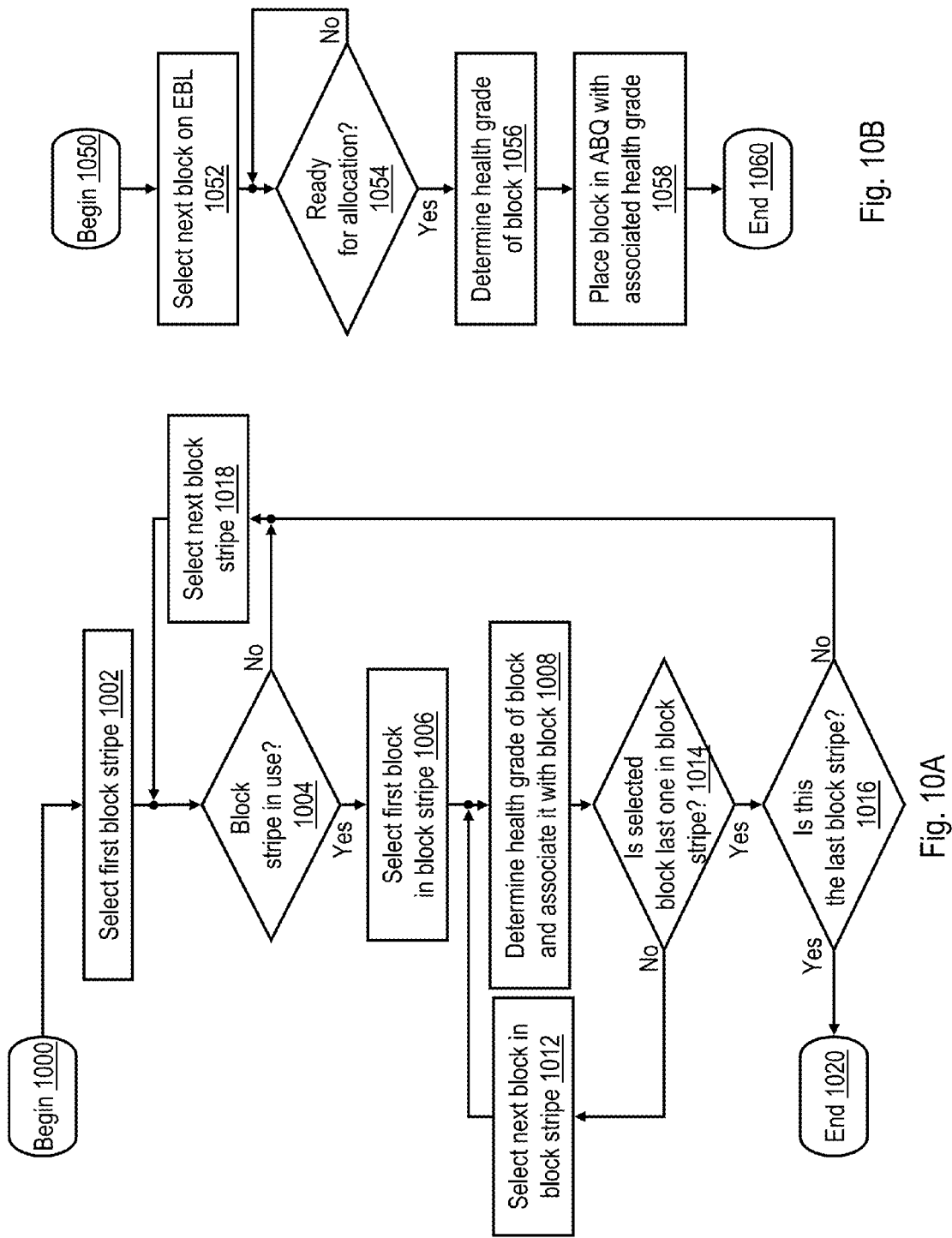

EXTENDING USEFUL LIFE OF A NON-VOLATILE MEMORY BY HEALTH GRADING

BACKGROUND OF THE INVENTION

This disclosure relates to data processing and storage, and more specifically, to extending the useful life of a non-volatile memory, such as a flash memory, by health grading.

Flash memory is a non-volatile memory technology that stores one or more bits of data per memory cell as a charge on the floating gate of a transistor. As cell densities and the number of bits stored per cell in flash memory continue to increase in subsequent generations of flash technology, the data stored in the memory cells to become more vulnerable to bit errors induced by read disturbs, high ambient temperatures, long storage durations and other factors. Consequently, the number of read/write cycles for which flash memories are rated have generally been declining even while storage density and cost per unit of data have been improving.

To obtain the longest useful life from a given flash memory various techniques have been proposed. In general, it has been presumed that the longest useful life is obtained by so-called "wear leveling," which is defined as equalizing the number of program/erase cycles across all blocks of physical memory in a flash memory array. As discussed further herein, the present disclosure appreciates that reliance on wear leveling alone does not achieve optimum memory lifetimes.

BRIEF SUMMARY

The present disclosure recognizes that, while the number of program/erase cycles can be considered as one factor in determining which blocks of physical memory in a non-volatile memory array are to be selected for programming, when other "health" factors, such as error metrics, are considered, greater useful memory lifetimes are achieved.

In at least one embodiment, a controller of a non-volatile memory array determines, for each of a plurality of regions of physical memory in the memory array, an associated health grade among a plurality of health grades and records the associated health grade. The controller also establishes a mapping between access heat and the plurality of health grades. In response to a write request specifying an address, the controller selects a region of physical memory to service the write request from a pool of available regions of physical memory based on an access heat of the address and the mapping and writes data specified by the write request to the selected region of physical memory.

BRIEF DESCRIPTION OF THE SEVERAL VIEWS OF THE DRAWINGS

FIG. 10A is a high level logical flowchart of an exemplary process by which a flash controller associates a health grade with a block of physical memory in accordance with one embodiment;

FIG. 10B is a high level logical flowchart of an exemplary process by which a flash controller places a block of physical memory with a given health grade into an ABQ in accordance with one embodiment;

DETAILED DESCRIPTION

Figure 1:
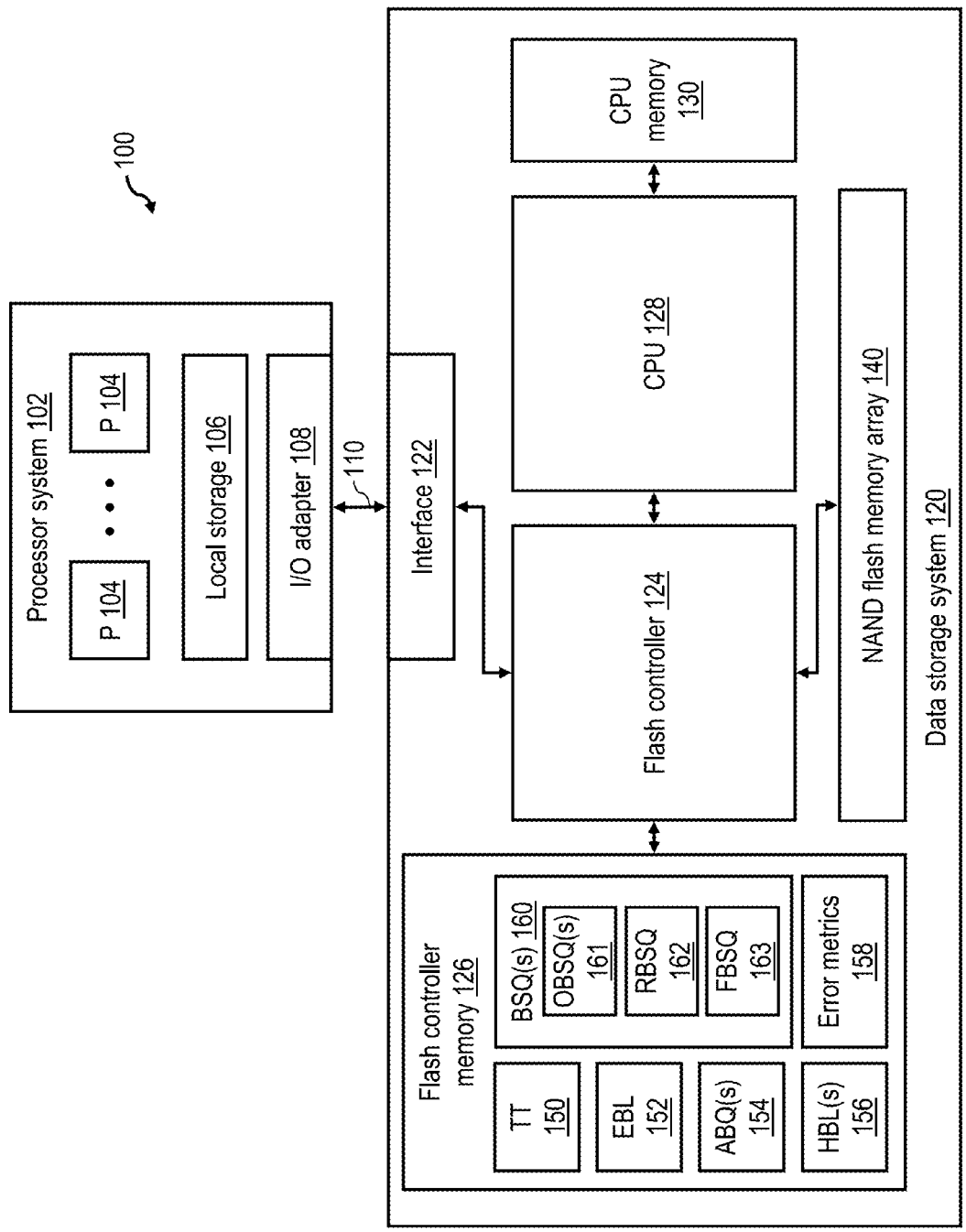
FIG. 1 is a high level block diagram of a data processing environment in accordance with one embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and with particular reference to FIG. 1, there is illustrated a high level block diagram of an exemplary data processing environment 100 including a data storage system having a non-volatile memory array as described further herein. As shown, data processing environment 100 includes at least one processor system 102 having one or more processors 104 that process instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER series available from International Business Machines Corporation), or a mainframe computer system. Processor system 102 can also be an embedded processor system using various processors such as ARM, PowerPC, Intel X86, or any other processor combined with memory caches, memory controllers, local storage, I/O bus hubs, etc.

Processor system 102 further includes an input/output (I/O) adapter 108 that is coupled directly (i.e., without any intervening device) or indirectly (i.e., through at least one intermediate device) to a data storage system 120 via an I/O channel 110. In various embodiments, I/O channel may employ any one or a combination of known or future developed communication protocols, including, for example, Fibre Channel (FC), FC over Ethernet (FCoE), Internet Small Computer System Interface (iSCSI), Transport Control Protocol/Internet Protocol (TCP/IP), Peripheral Component Interconnect Express (PCIe), etc. I/O operations (IOPs) communicated via I/O channel 110 include read IOPs by which processor system 102 requests data from data storage system 120 and write IOPs by which processor system 102 requests storage of data in data storage system 120.

In the illustrated embodiment, data storage system 120 includes an interface 122 through which data storage system 120 receives and responds to IOPs 102 via I/O channel 110. Interface 122 is coupled to a flash controller 124 (e.g., an Application Specific Integrated Circuit (ASIC) or Field Programmable Gate Array (FPGA)) having an associated flash controller memory 126 (e.g., Dynamic Random Access Memory (DRAM)). Flash controller 124 is additionally coupled to a CPU 128 having an associated CPU memory 130 (e.g., DRAM) and further coupled to a non-volatile memory array, such as NAND flash memory array 140. In embodiments in which flash controller 124 is implemented with an FPGA, CPU 128 may program and configure flash controller 124 during start-up of data storage system 120. After startup, in general operation flash controller 124 receives read and write IOPs via I/O channel 110 and interface 122 to read data stored in NAND flash memory array 140 and/or to store data in NAND flash memory array 140. Flash controller 124 services these IOPs, for example, by accessing NAND flash memory array 140 to read or write the requested data from or into NAND flash memory array 140 or by accessing a memory cache (not illustrated) associated with NAND flash memory array 140.

Flash controller 124 implements a flash translation layer (FTL) that provides logical-to-physical address translation to enable access to specific memory locations within NAND flash memory array 140. In general, an IOP received by flash controller 124 from a host device, such as a processor system 102, contains the logical block address (LBA) at which the data is to be accessed (read or written) and, if a write IOP, the write data to be stored to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory array 140, is constrained by its construction such that the smallest granule of data that can be accessed by a read or write IOP is fixed at the size of a single flash memory page, for example, 16 kilobytes (kB). The LBA provided by the host device thus corresponds to a page within a logical address space. The flash translation layer translates this LBA into a physical address assigned to a corresponding physical location in NAND flash memory array 140. Flash controller 124 may perform address translation and/or store mappings between logical and physical addresses in a logical-to-physical translation data structure, such as translation table (TT) 150, which may conveniently be stored in flash controller memory 126.

As further shown in FIG. 1, flash controller 124 may maintain one or more additional data structures to track information regarding NAND flash memory array 140, which data structures may also be buffered in flash controller memory 126. These data structures can include, for example, an erased block list (EBL) 152 that identifies blocks of physical memory in NAND flash memory array 140 that have been erased, one or more available block queues (ABQs) 154 that identify blocks of physical memory in NAND flash memory array 140 that are available for programming, and one or more block stripe queues (BSQ) 160, which include one or more occupied block stripe queues (OBSQ) 161 holding block stripes of blocks with written data eligible for garbage collection, a relocation block stripe queue (RBSQ) 162 that identifies block stripes being selected for garbage collection, and a free block stripe queue (FBSQ) 163 for block stripes which currently have no data blocks assigned. In a preferred embodiment, for each block of physical memory, the one or more ABQs 154 identify the health grade of the block, where the "health" or "health grade" is defined herein as an estimate of the remaining life of the block prior to being retired from use. Thus, a "healthier" block is defined to be one having a relatively longer estimated remaining life, and a "less healthy" block is defined to be one having a relatively shorter remaining life. For example, in one possible implementation, four health grades are defined ranging from least healthy to most healthy, and blocks of each health grade are placed on a respective one of four ABQs 154. In another implementation, only a single ABQ 154 is used, and each entry in the ABQ 154 includes a health grade field encoding the health of an associated block of physical memory.

The data structures in flash controller memory 126 can also include one or more heat bin lists (HBLs) 156 that specify an observed access frequency (defined herein as "heat") of each LBA served by data storage system 120. In various embodiments, the heat can be indicate frequency of write accesses only or both write and read accesses. The number of heat bins can, but is not required to equal, the number of health grades. In one possible implementation, four heat bins are defined ranging from coldest (i.e., least frequently accessed) to hottest (i.e., most frequently accessed), and blocks or block stripes of each heat are identified by being placed on a respective one of four HBLs 156. In another implementation, only a single unified HBL 156 is used, and each entry in the HBL 156 includes a heat field encoding the heat bin into which each block or block stripe of physical memory falls. In yet another implementation, HBLs 156 includes two lists, the first one tracking access frequency for each LBA or ranges of LBAs and second one maintaining a heat field encoding the heat bin of each block or block stripe.

The data structures in flash controller memory 126 can further include error metrics 158 that indicate one or more error metrics per region of physical memory (e.g., block or page) in NAND flash memory array 140. For example, error metrics 158 can include the per-page and/or per-block bit error count, bit error rate, and/or rate of change of bit error rate (i.e., the derivative of the bit error rate). In addition, error metrics 158 can include the worst and/or average per-page bit error count, bit error rate and/or bit error rate derivative for each block. In one possible implementation only the health distribution of all blocks is stored in the error metrics. This distribution is then used to assign health grades to blocks by means of a set of adaptive thresholds that classify blocks into one of the given health grades according to a fixed percentage of the health distribution. For example, the healthiest 20 percent of the blocks will be classified as grade A, the next 20 percent as grade B, and so on.

As will be appreciated by those skilled in the art, in various embodiments flash controller 124 may combine one or more of the data structures depicted in flash controller memory 126 in a common data structure and/or implement additional data structures to manage NAND flash memory array 140.

NAND flash memory array 140 may take many forms in various embodiments. Referring now to FIGS. 2-5, there is depicted one exemplary arrangement of physical memory within a NAND flash memory array 140 in accordance with the present disclosure.

Figure 2:
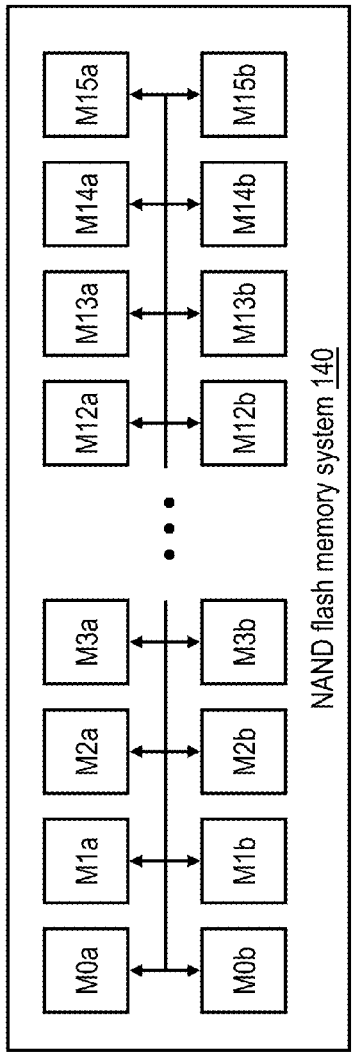
FIGS. 2-5 illustrate an exemplary arrangement of physical memory within a NAND flash memory array in accordance with the present disclosure.

As shown in FIG. 2, NAND flash memory array 140 may be formed from thirty-two (32) individually addressable NAND flash memory storage devices. In the illustrated example, each of the flash memory storage devices M0a-M15b takes the form of a board-mounted flash memory module, for example, a Single Level Cell (SLC), Multi-Level Cell (MLC), Three Level Cell (TLC), or Quad Level Cell (QLC) NAND flash memory module. The thirty-two NAND flash memory modules are arranged in sixteen groups of two (M0a, M0b) through (M15a, M15b). For purposes of the physical addressing scheme, each group of two modules forms a "lane," also sometimes referred to as a "channel," such that NAND flash memory array 140 includes sixteen channels or lanes (Lane0-Lane15).

In a preferred embodiment, each of the individual lanes has a respective associated bus coupling it to flash controller 124. Thus, by directing its communications to one of the specific communication buses, flash controller 124 can direct its communications to one of the lanes of memory modules. Because each communication bus for a given lane is independent of the communication buses for the other lanes, flash controller 124 can issue commands and send or receive data across the various communication buses at the same time, enabling flash controller 124 to access the memory modules corresponding to the individual lanes at, or very nearly at, the same time.

Figure 3:
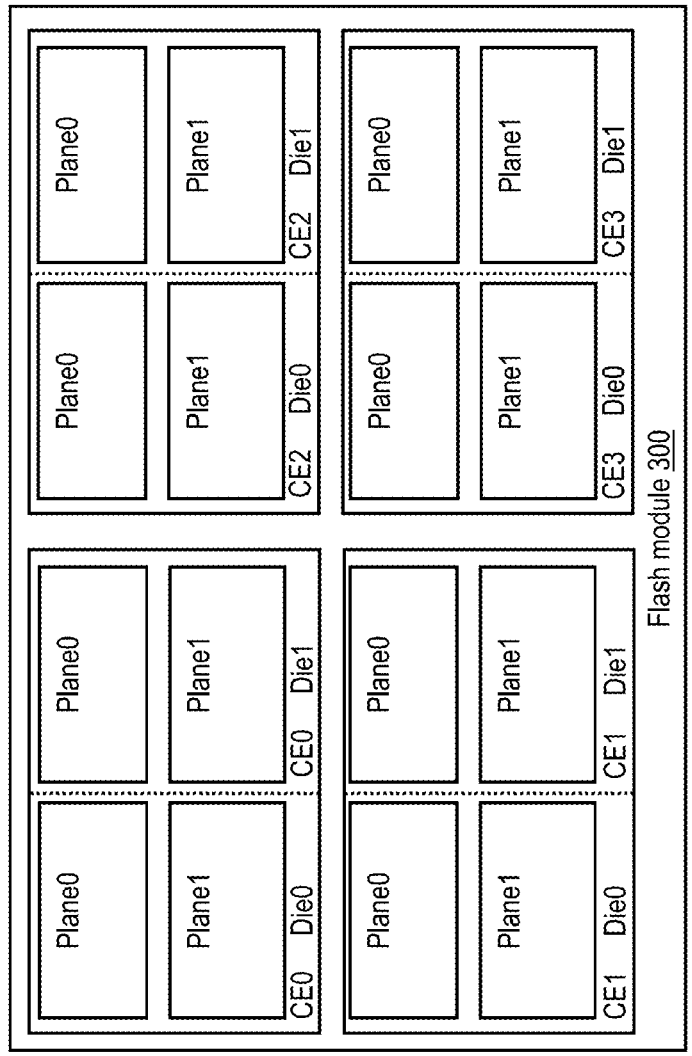

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 124 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
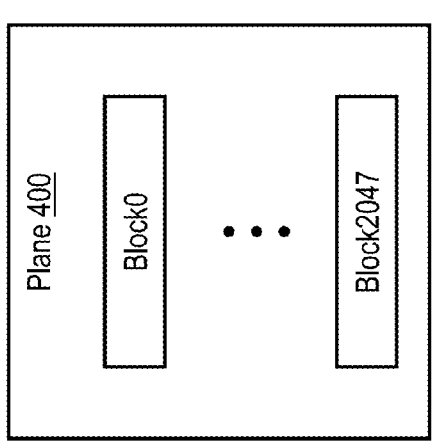
Figure 5:
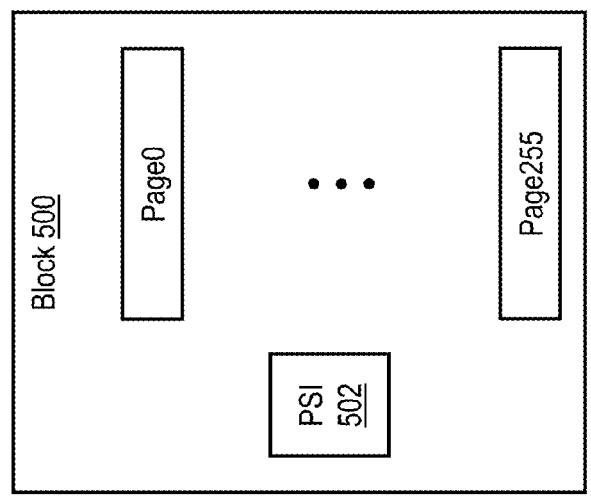

As further shown in FIGS. 4-5, an exemplary plane 400, which can be utilized to implement any of the planes within flash memory module 300 of FIG. 3, includes, for example, 2048 blocks of physical memory. In general, a block 500 is a collection of physical pages that are associated with one another, typically in a physical manner. This association is such that a block is defined to be the smallest granularity of physical storage locations that can be erased within NAND flash memory array 140. In the embodiment of FIG. 5, each block 500 includes, for example, 256 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory array 140 on a page-by-page basis, but erased on a block-by-block basis. As further shown in FIG. 5, each block 500 preferably includes page status information 502, which indicates the status of each physical page in that block 500 as retired (i.e., withdrawn from use) or non-retired (i.e., active or still in use). In various implementations, PSI 502 can be collected into a single data structure (e.g., a vector or table) within block 500, distributed within block 500 (e.g., as one or more bits of metadata appended to each physical page) or maintained elsewhere in data storage system 120 (e.g., in a data structure in flash controller memory 126).

As noted above, data storage system 120 does not generally allow external devices to directly address and/or access the physical memory locations within NAND flash memory array 140. Instead, data storage system 120 is generally configured to present a single contiguous logical address space to the external devices, thus allowing host devices to read and write data to and from LBAs within the logical address space while permitting flash controller 124 and CPU 128 to control where the data that is associated with the various LBAs actually resides in the physical memory locations comprising NAND flash memory array 140. In this manner, performance and longevity of NAND flash memory array 140 can be intelligently managed and optimized.

As writes occur to data storage system 120, it will be necessary for flash controller 124 and CPU 128 to invalidate the data stored in one of the physical pages of one of the erase blocks in the NAND flash memory array 140. The new data will then be coalesced with data being written and eventually stored in different location in NAND flash memory array 140. It can be seen then that pages or portions of pages will be invalidated and therefore portions of the NAND flash memory array 140 become unused. Flash controller 124 and CPU 128 will eventually need to reclaim this space through a process called garbage collection. Particular erase blocks or block stripes consisting of erase blocks will be chosen based on a number of factors including, for example, the health of the blocks and how much of the data within the erase blocks is invalid. Flash controller 124 logs the physical block addresses (PBAs) of erased blocks in EBL 152. Valid data will be read and written along with new writes from the host into blocks allocated from the one or more ABQs 154.

Because the flash translation layer implemented by data storage system 120 isolates the logical address space made available to host devices from the physical memory within NAND flash memory array 140, the size of NAND flash memory array 140 need not be equal to the size of the logical address space presented to host devices. In most embodiments it is beneficial to present a logical address space that is less than the total available physical memory (i.e., to over-provision NAND flash memory array 140). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cycle Redundancy Check (CRC), and parity.

Figure 6A:
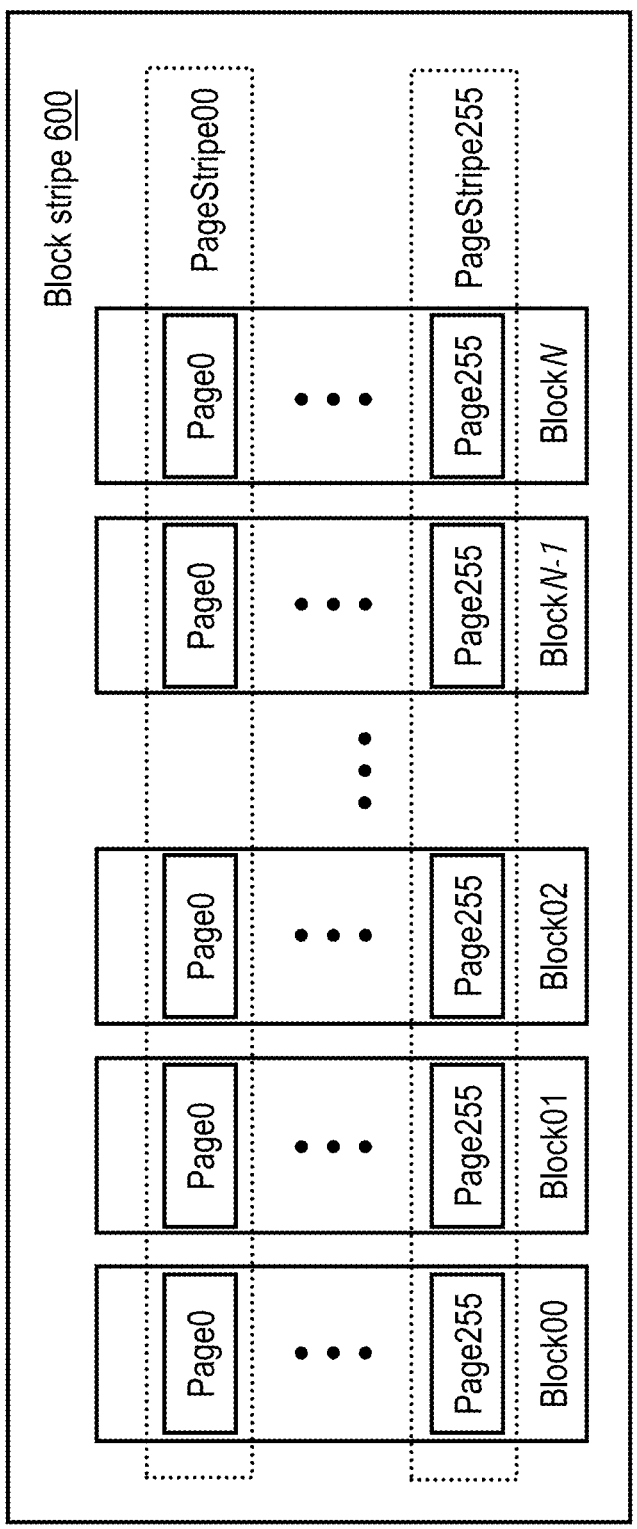
FIG. 6A depicts an exemplary implementation of a block stripe in accordance with the present disclosure.
Figure 6B:
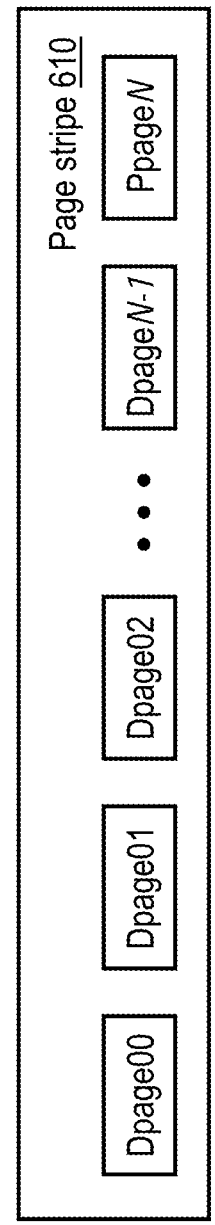
FIG. 6B depicts an exemplary implementation of a page stripe in accordance with the present disclosure.

In some embodiments, data is written to NAND flash memory array 140 one physical page at a time. In other embodiments in which more robust error recovery is desired, data is written to groups of associated physical pages of NAND flash memory array 140 referred to herein as "page stripes." In a preferred embodiment, all pages of a page stripe are associated with different lanes to achieve high write bandwidth. Because in many implementations the smallest erase unit is a block, page stripes are grouped into a block stripe as is shown in FIG. 6A, where each block in the block stripe is associated to a different lane. When a block stripe is built, any free block from the ABQ of a lane can be chosen, but preferably all blocks should have the same or similar health grade. Note that the block selection can be further restricted to be from the same plane, die, and/or chip enable. Once a block from each lane has been picked, page stripes are preferably formed from pages with the same page number from all blocks in the block stripe. While the lengths of the various page stripes stored into NAND flash memory array 140 can and preferably do vary, in one embodiment each page stripe includes two to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The addition of a data protection page as illustrated requires that garbage collection be performed for all page stripes of the same block stripe at the same time. After garbage collection of the block stripe completes, the block stripe can be dissolved, and each block can be placed into the EBL or ABQ as explained below.

Figure 7:
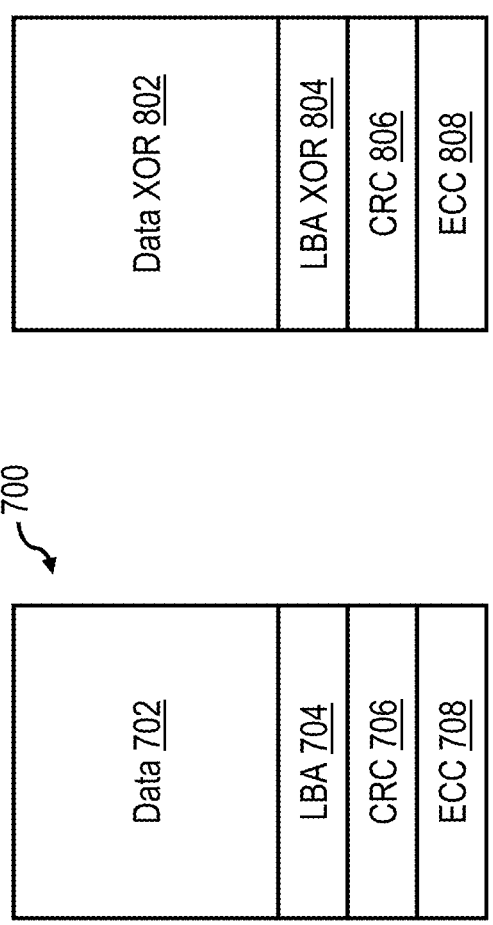
FIG. 7 illustrates an exemplary data page in accordance with the present disclosure.

FIG. 7 illustrates an exemplary format of each data page within page stripe 610 of FIG. 6. In this example, each data page 700 includes a 16 kB data field 702, as well as additional fields for metadata describing the data page. In the illustrated example, these metadata fields include an LBA field 704 containing the LBAs stored in data page 700, a CRC field 706 containing the CRC value computed for the combination of data field 702 and LBA field 704, and an ECC field 708 containing an ECC value calculated, in the illustrated example, from a combination of contents of data field 702, LBA field 704 and CRC field 706.

Figure 8:
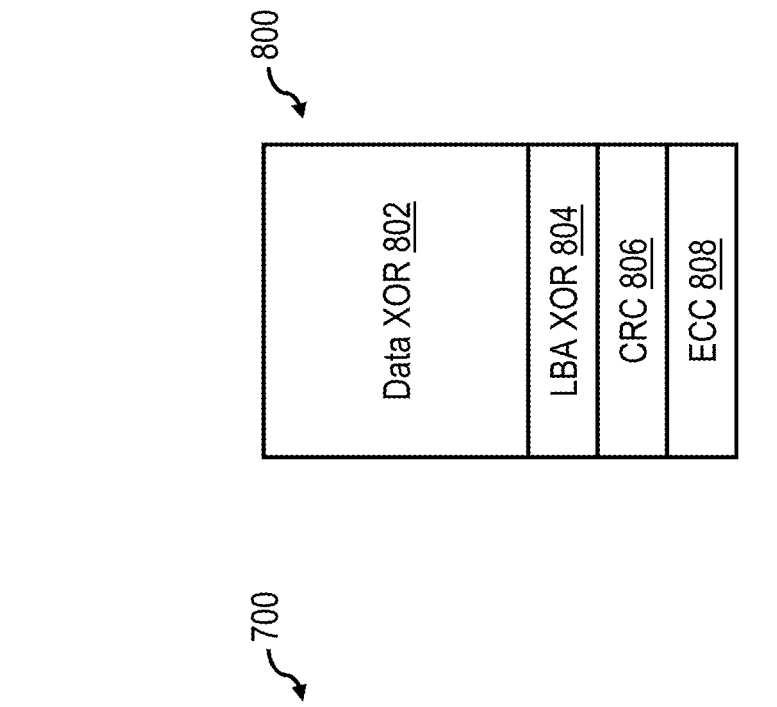
FIG. 8 depicts an exemplary data protection page in accordance with the present disclosure.

FIG. 8 depicts an exemplary format of the data protection page of page stripe 610 of FIG. 6. In the depicted example, data protection page 800 includes a data XOR field 802 that contains the bit-by-bit Exclusive Or (XOR) of the contents of the data fields 702 of the data pages 700 in page stripe 610. Data protection page 800 further includes an LBA XOR field 804 that contains the bit-by-bit XOR of the LBA fields 704 of the data pages 700 in page stripe 610. Data protection page 800 finally includes a CRC field 806 and ECC field 808 for respectively storing a CRC value and an ECC value for data protection page 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different protection mechanisms. First, the use of the ECC bits in each data page allows the correction of some number of bit errors within the flash page. Depending on the ECC method used it may be possible correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory array 140, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data page and data protection page. Such embodiments support efficient access to a page stripe because flash controller 124 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described, including aspects relating to allocation of blocks for programming, writing (programming) pages of NAND flash memory array 140, and reading data from NAND flash memory array 140.

Figure 9:
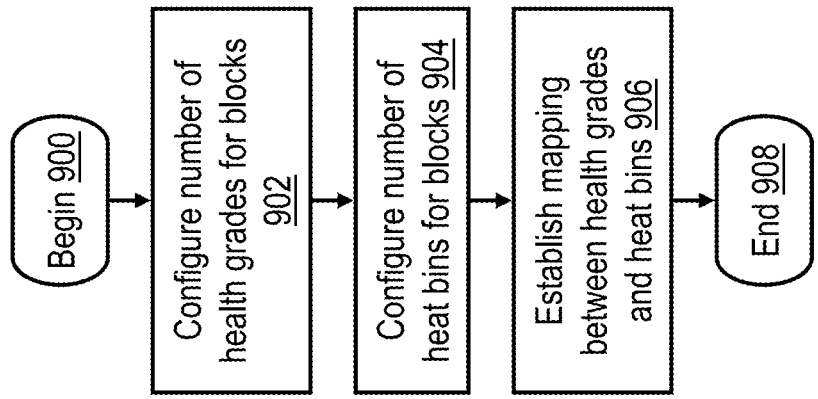
FIG. 9 is a high level logical flowchart of an exemplary process by which a flash controller configures health grades and heat bins in accordance with one embodiment.

With reference now to FIG. 9, there is illustrated a high level logical flowchart of an exemplary process by which health grades and heat bins are configured in accordance with one embodiment. The method may be performed, for example, by flash controller 124 and/or CPU 128 in hardware, firmware, software or a combination thereof at startup of data storage system 120. For simplicity of explanation, it will hereafter be assumed that the process is performed by flash controller 124. As with the other logical flowcharts presented herein, operations are presented in logical rather than strictly chronological order, and in some embodiments, operations can be performed in a different order than presented or concurrently.

The configuration process of FIG. 9 begins at block 900 and then proceeds to block 902, which illustrates flash controller 124 configuring a desired number of health grades for blocks of physical memory in NAND flash memory array 140. In various embodiments, the number of health grades can vary, but experimentally a number of health grades between two and eight inclusive has been found to be effective. For example, in one embodiment, flash controller 124 configures four health grades at block 902. As noted above, the health grades employed herein are specifically defined to be based on one or more criteria other than the number of program/erase cycles, for example, one or more error metrics for each block (and/or the physical pages within each block) of physical memory.

At block 904, flash controller 124 additionally configures a desired number of heat bins for LBAs served by NAND flash memory array 140. In various embodiments, the number of heat bins can vary, but experimentally a number of heat bins between two and eight inclusive has been found to be effective. For example, in one embodiment, flash controller 124 configures four heat bins at block 904. As noted above, the number of heat bins may, but need not, equal the number of health grades.

At block 906, flash controller 124 establishes a mapping between the heat bins configured at block 904 and the health grades configured at block 902. In one particularly preferred embodiment, heat and health are directly correlated, with the hottest LBAs mapped to the healthiest grades and the coldest LBAs mapped to a less healthy grade. Of course, in other embodiments, other mappings between access heat and health grades may be employed. For example, in one embodiment in which numeric heat and health grades are employed, the mapping established at block 906 is determined by a mathematical function selected to yield an approximately constant result from health grades and access heats that are mapped to one another (e.g., $C \approx f$ (heat, health)). In another embodiment, the mapping from heat to health grade maps every heat bin to a sorted priority list of health grades. At the time block stripes are built from blocks in the ABQs, there might not be a block in the preferred ABQ with a given health grade. The sorted priority list then allows assignment of a block from another ABQ with a health grade as close as possible to the preferred one. Following block 906, the configuration process given in FIG. 9 ends at block 908.

Referring now to FIG. 10A, there is depicted a high level logical flowchart of an exemplary process by which a flash controller associates a health grade with a block of physical memory in accordance with one embodiment. This process can be executed in the background, and/or during idle times, for example, in regular periods of several tens or hundreds of full physical device writes or regular time intervals (e.g., of one or more weeks) or a combination thereof. The process of FIG. 10A begins at block 1000 and then proceeds to block 1002, which depicts flash controller 124 selecting a first block stripe on BSQ 160, which, as noted above, can include a list of block stripes holding blocks of physical memory in NAND flash memory array 140 that have been written to by flash controller 124 or a list of empty block stripes which currently have no blocks assigned. Next, at block 1004, flash controller 124 determines whether or not the selected block stripe is still in use holding blocks of physical memory with written data. In case the block stripe is in use, a first block of the block stripe is selected at block 1006. Otherwise the process continues with selecting the next block stripe at block 1018.

At block 1008, flash controller 124 determines the health grade of the selected block of physical memory. In various embodiments, flash controller 124 determines the health grade from one or more criteria, for example, one or more of error metrics 158, which can be determined in this step. The health grade may also take into account the number of program/erase cycles, but the health grade is not based solely on the number of program/erase cycles, as that metric has been found experimentally to have weaker correlation to the actual longevity of blocks of physical memory and is thus not determinative of a block's "health." At block 1014 flash controller 124 determines whether or not there are more blocks in the block stripe. In response to a determination at block 1014 that the block stripe contains one or more additional blocks, the next block is selected from the block stripe at block 1012, and flash controller 124 continues processing at block 1008. In response to a determination that the current block is the last block in the block stripe, flash controller 124 determines if there are more block stripes to be processed. In response to a determination at block are more block stripes that remain to be processed, flash controller 124 selects the next block stripe at block 1018 and continues processing at block 1004. Otherwise, the process of FIG. 10A ends at block 1020.

With reference now to FIG. 10B, there is depicted a high level logical flowchart of an exemplary process by which a flash controller places a block of physical memory with a given health grade into an ABQ in accordance with one embodiment. The process of FIG. 10B begins at block 1050 and then proceeds to block 1052, which depicts flash controller 124 selecting a next block on EBL 152, which, as noted above, is a list of blocks of physical memory in NAND flash memory array 140 that have been erased by flash controller 124, for example, as part of the garbage collection process. Next, at block 1054, flash controller 124 determines whether or not the selected block of physical memory is ready to be allocated for programming with write data. In at least some embodiments, the determination depicted at block 1004 can include a determination of whether or not a recommended dwell time for the selected block of physical memory has been satisfied. The process iterates at block 1054 until a determination is made that the selected block is ready to be allocated for programming with write data. At block 1056, flash controller 124 determines the health grade of the selected block of physical memory. In one embodiment, the health grade has already been assigned in the background by the process described in FIG. 10A. In other embodiments, flash controller 124 determines the health grade at this point from one or more criteria, for example, one or more of error metrics 158. The health grade may also take into account the number of program/erase cycles, but the health grade is not based solely on the number of program/erase cycles, as that metric has been found experimentally to have weaker correlation to the actual longevity of blocks of physical memory and is thus not determinative of a block's "health."

As shown at block 1058, flash controller 124 then places the selected block in an appropriate ABQ 154 and associates the health grade determined at block 1056 with the selected block, for example, by placing the selected block in an ABQ 154 exclusively utilized to track available blocks having the determined health grade, or alternatively, by encoding the health grade in an entry for the selected block in a common ABQ 154 shared by blocks of multiple (or all) health grades. Once placed in the ABQ 154, the selected block is available for flash controller 124 to allocate for programming with write data. Following block 1058, the process of FIG. 10B ends at block 1060.

Figure 11:
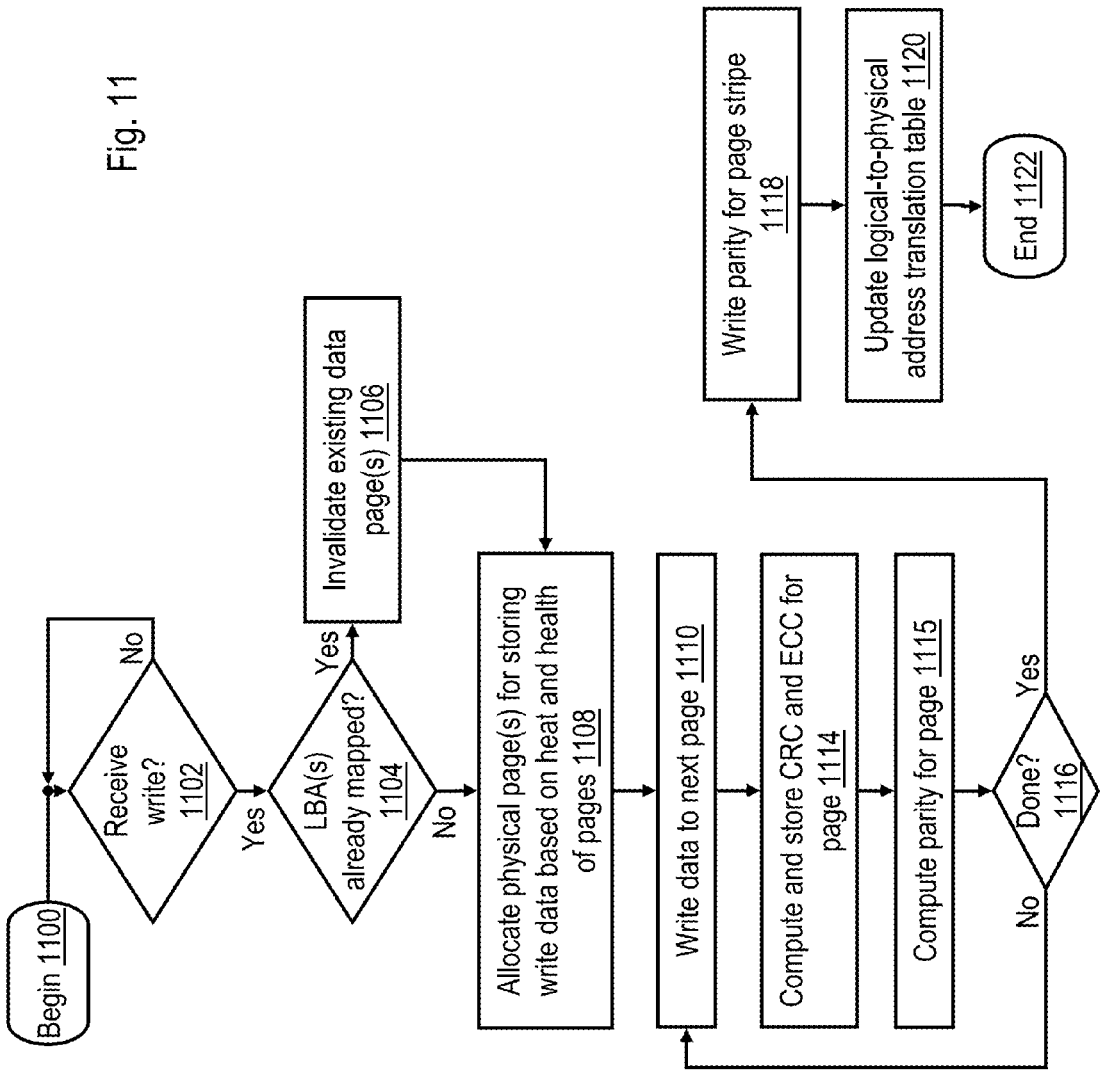
FIG. 11 is a high level logical flowchart of an exemplary embodiment of a data write process by which a data page is written to a non-volatile memory array.

With reference now to FIG. 11, there is illustrated a high level logical flowchart of an exemplary embodiment of a data write process by which a data page is written into a non-volatile memory array. The method may be performed, for example, by flash controller 124 and/or CPU 128 in hardware, firmware, software or a combination thereof. For simplicity of explanation, it will hereafter be assumed that the process is performed by flash controller 124.

The method begins at block 1100 and then proceeds to block 1102, which illustrates flash controller 124 receiving a write request, for example, a write IOP from a host device, such as processor system 102, or a write request generated by the garbage collection or error recovery process by which data formerly residing elsewhere within NAND flash memory array 140 is to be moved to a different location within NAND flash memory array 140. The write request includes, for example, the write data to be written into NAND flash memory array 140 and the target LBA(s) associated with the write data. In response to receipt of a write request, the process proceeds from block 1102 to blocks 1104-1106, which illustrates flash controller 124 determining (e.g., by reference to logical-to-physical address translation table 150) whether the target LBA(s) indicated in the write request is/are currently mapped to physical memory page(s) and, if so, changing the status of each data page currently associated with a target LBA to indicate that it is no longer valid. As is known in the art, invalidated pages (and the blocks containing them) will eventually be erased and again made available for allocation to store data by a garbage collection process of flash controller 124.

At block 1108, flash controller 124 allocates one or more physical pages to store the write data. In some commercial embodiments, only one page may be allocated. In this case, flash controller 124 preferably allocates the pages from a block taken from one of the ABQs 154 based on the health of the blocks available for allocation, the access heat of the target LBA indicated by HBL(s) 156, and the mapping between heat bins and health grades established at block 906 of FIG. 9. In other embodiments, multiple pages forming a page stripe are allocated to store the write data, as described above with reference to FIG. 6B. In the latter case, it is assumed that a block stripe holding page stripes has already been allocated by CPU 128 and made available to the flash controller 124. The block stripe had been built by CPU 128 using blocks from the one or more ABQs 154 based on the health of the blocks available for allocation and the target access heat that had been assigned to the block stripe and consequently also to its page stripes. Block 1108 therefore allocates physical pages from a page stripe that best matches the access heat of the target LBA indicated by HBL(s) 156 using the preferred mapping between heat bins and health grades established at block 906 of FIG. 9. As CPU 128 made sure in advance that there are block stripes for all heat bins, the mapping corresponds to the preferred mapping. However, at the time CPU 128 built the block stripe from blocks in the ABQs 154 there might not have been available blocks with the preferred mapping. In this case CPU 128 built the block stripe from blocks of other ABQs 154 that closely track the mapping according to the function defined at block 906 of FIG. 9. The advantage of this method is that data pages with similar heat are written into the same block stripe and are hence likely to be invalidated roughly at the same time in the future, which reduces the number of still valid pages that must be relocated upon garbage collection. As a consequence, block stripes built from healthier blocks are used more frequent as they will hold hotter data than others. This finally results in a more consistent health distribution of all blocks and therefore significantly increases overall endurance.

At block 1110, flash controller 124 begins to store the write data to the allocated page(s). In the depicted embodiment, flash controller 124 writes data into a page stripe, and at block 1110 programs the first data page of the write data to the first physical page allocated to the page stripe. At block 1114, flash controller 124 additionally determines metadata for the page and stores the metadata in the memory block containing the page, either in the page itself or elsewhere in the memory block (e.g., as part of PSI 502). For example, as specifically indicated at block 1114, the metadata may include CRC and ECC values for the data page, which flash controller 124 may store in CRC field 706 and ECC field 708 of the data page. At block 1115, flash controller 124 also computes the parity information for the data page.

At block 1116, flash controller 124 determines whether all of the write data has been written into NAND flash memory system 140. If flash controller 124 determines that less than all of the write data has been written to NAND flash memory system 140, the process returns to block 1110, which has been described. In response to a determination that all of the write data has been stored in NAND flash memory system 140 (and a determination that the parity computation for all data pages in the page stripe is complete), flash controller 124 stores the parity information for the page stripe in the data protection page of the page stripe (block 1118). Flash controller 124 also updates the logical-to-physical address translation table to associate the physical page(s) utilized to store the write data with the LBA(s) indicated by the host device (block 1120). Thereafter, the process of FIG. 11 ends at block 1122.

It should be noted that at least blocks 1108, 1110 and 1114 will include steps that check whether or not the programming of the physical page completed correctly. If flash controller 124 determines that the write did not complete correctly, then flash controller 124 will employ various recovery techniques, such as finishing the page stripe, including parity, and rebuilding the page stripe in a new location. If the write is unsuccessful, then flash controller 124 can also retire a physical page for which the write failed in the same manner as when a read is unsuccessful (as discussed below).

Figure 12:
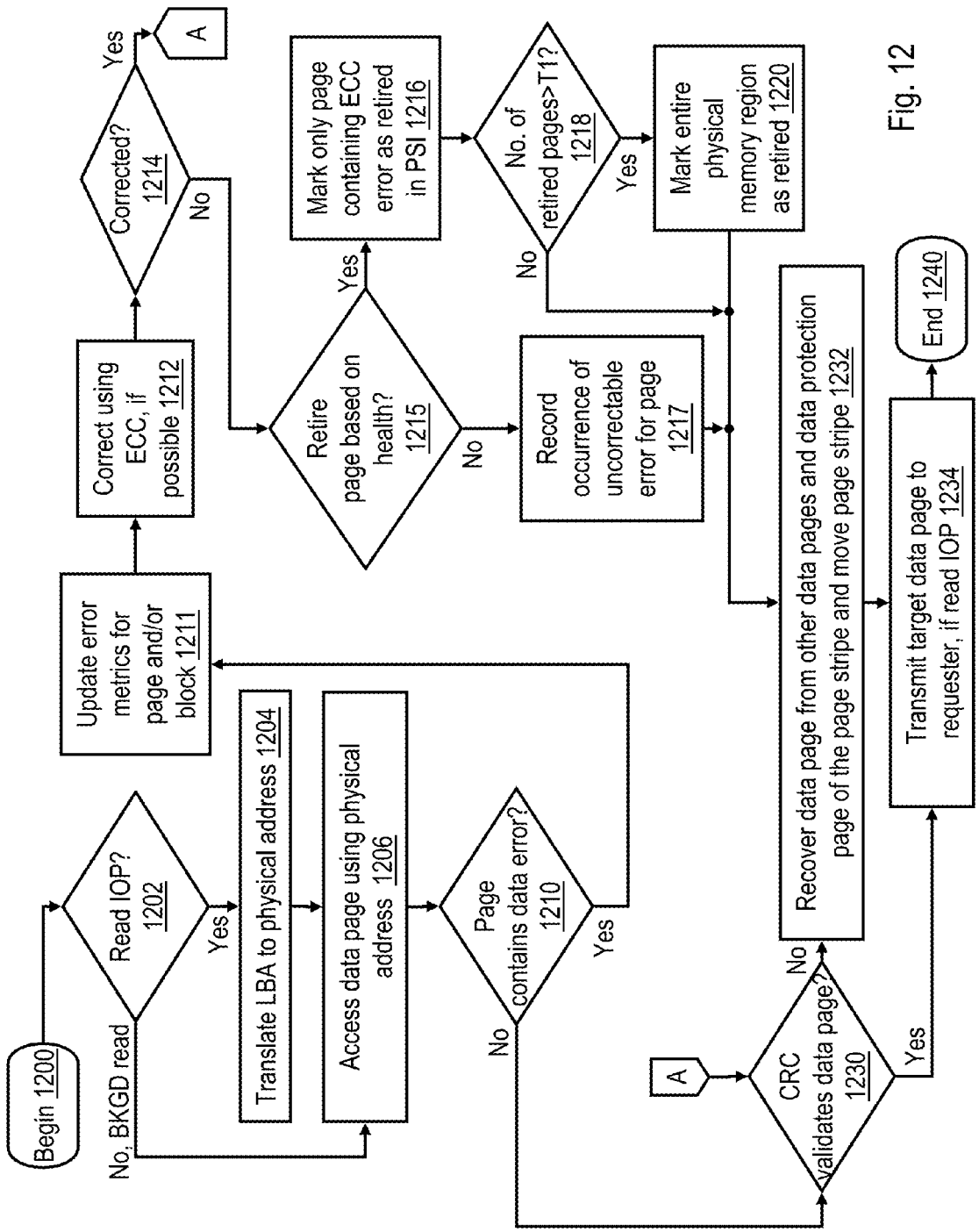
FIG. 12 is a high level logical flowchart of an exemplary embodiment of a data read process by which data is read from a non-volatile memory array.

Referring now to FIG. 12, there is depicted a high level logical flowchart of an exemplary embodiment of a data read process by which data is read from a non-volatile memory array, such as NAND flash memory array 140. The method may be performed, for example, by flash controller 124 and/or CPU 128 in hardware, firmware, software or a combination thereof. For simplicity of explanation, it will hereafter be assumed that the process is performed by flash controller 124.

The process of FIG. 12 begins at block 1200 in response to receipt by flash controller 124 of a read request and then proceeds to block 1202. At block 1202, flash controller 124 determines whether the read request is a read IOP received from an external host device, such as processor system 102, or is a read request of a background read process of flash controller 124. Flash controller 124 may employ such a background read process when flash controller 124 is less than fully busy servicing read and write IOPs of processor systems 102, for example, to detect and correct errors, to determine block health information, or to determine optimal read parameters. The background read process may, for example, sequentially read pages of physical memory in NAND flash memory array 140 that store valid or invalid data pages.

If flash controller 124 determines at block 1204 that the read request originated from a background read process, the process passes from block 1202 to block 1206, which is described below. If, however, flash controller 124 determines at block 1202 that the read request is a read IOP of an external host device, flash controller 124 translates the LBA specified by the read IOP (e.g., by reference to logical-to-physical translation table (TT) 150 in flash controller memory 126) to determine the physical address of the physical page that stores the requested data page (block 1204). Once the physical address is determined, flash controller 124 accesses the target data page utilizing the physical address by issuing to NAND flash memory array 140 a read request to read the target data page from the physical page associated with the physical address (block 1206). The read request may request various sizes of data, but for simplification it is assumed that the process of FIG. 12 is exercised once for each data page referenced by the read request.

At block 1210, flash controller 124 computes the ECC for the data page and compares the computed ECC with the ECC contents of ECC field 708 to determine whether or not the data page contains a data error. Such data errors can be due to any number of problems, including trapped charge in the oxide layer of the physical device or charge that has leaked from the floating gate. These errors may be permanent in nature such that the cell is no longer capable of storing and reading data correctly or the errors may be due to issues related to data retention or electrical noise inflicted by writes or reads of adjacent cells. The latter type of errors will not be present when the cell is erased and then rewritten. True soft errors are substantially random and are typically not uniquely associated with any specific physical pages, blocks or other physical regions of NAND flash memory array 140. A hard error, on the other hand, is a corruption of one or multiple bits of data caused by a physical failure. Hard errors can be caused by a variety of factors including, but not limited to, the physical failure of one or more components within a given memory chip (such as the failure of a charge pump), the physical failure of an entire memory chip or the external support structures for that chip (e.g., the breaking of a power line or an address line to a chip), the physical failure of all or part of a chip as a result of environmental factors (e.g., excessive temperature, magnetic field, humidity, etc). In general, because hard errors arise from the physical structure of the memory system, hard errors are uniquely associated with a particular collection of memory chips, a particular memory chip, or specific physical regions within a chip (such as a CE, plane, block or page).

In response to a determination at block 1210 that the data page does not contain a data error, the process passes to block 1230, which is described below. However, in response to a determination at block 1210 that the data page contains one or more data errors, flash controller 124 updates the error metrics 158 with the errors found for the physical page and/or block storing the target data page (block 1211). Note that this update process might be different for background reads and host reads, i.e., error metrics 158 might be fully or partially updated, aggregated, or not updated at all in one or the other case. In addition, flash controller 124 corrects the data error in the data page utilizing the ECC, if possible (e.g., if there are 50 bits in error within the codeword and the ECC is capable of correcting greater than 50 bits in error within the code word), as shown at block 1212. At block 1214, flash controller 124 determines whether or not the detected data error has been corrected utilizing the ECC. If so, the process proceeds from block 1214 through page connector A to block 1230, which is described below. If, on the other hand, flash controller 124 determines at block 1214 the data error is uncorrectable, flash controller 124 further determines at block 1215 whether or not the physical page that stores the data page in which the error occurred should be retired from use. The determination depicted at block 1215 can be made, for example, based on the health grade or the error metrics 158 for the physical page, which can be recomputed at block 1215 in light of the newly detected error(s) in the physical page. In response to a determination at block 1215 that the physical page should be retired from use, the process proceeds to block 1216, which is described below. If, on the other hand, flash controller 124 determines that the physical page should not be retired, the process passes to block 1217, which illustrates flash controller 124 recording the occurrence of an uncorrectable error in the physical page. Thereafter, the process passes to block 1232, which is described below.

At block 1216, flash controller 124 marks only the physical page that stores the target data page as retired (i.e., no longer available for allocation to store a data page of a new page stripe), for example, in the PSI 502 of the block containing that physical page. Thus, in contrast to prior art systems that retire physical memory in a NAND flash memory on a block-by-block basis, data storage system 120 can preferably retire physical memory in NAND flash memory array 140 on a page-by-page basis in response to detection of a single data error. As will be appreciated, retirement of a physical page of physical memory (e.g., 16 kB) rather than a block (e.g., 4 MB) conserves physical memory resources, enhancing the performance and extending the life of NAND flash memory array 140. However, as a consequence of page retirement, the effective sizes of blocks of physical memory of NAND flash memory system 140 will vary.

This exemplary implementation waits until a physical page has one or more codewords containing uncorrectable errors before performing the retirement. However, certain implementations may choose to retire a page at some point prior to uncorrectability. For example, if an implementation uses BCH ECC over approximately 1024 bytes and can correct 50 bits in error, flash controller 124 may decide to retire a page when the number of uncorrectable bits reaches a number less than 50, say 48. Additionally, one skilled in the art will also know that, depending on the flash technology used, that flash controller 124 may elect to perform additional steps at blocks 1212-1214 before retiring the page. For example, the flash manufacturer may require flash controller 124 to change certain parameters for that page or block and perform a re-read of the page. If the data is still correctable, then flash controller 124 would follow the negative path from block 1214. In this way, blocks 1212-1214 may contain many additional steps not described herein in determining that the page is truly uncorrectable.

At block 1218, flash controller 124 further determines by reference to PSI 502 whether or not the number of retired pages of physical memory in a physical memory region containing the page retired at block 1216 now satisfies (e.g., is greater than and/or equal to) a threshold T1. The physical memory region to which the first threshold T1 pertains can be, for example, a block, plane, die, CE or entire flash module. In response to flash controller 124 determining at block 1218 that the threshold T1 is not satisfied, the process passes to block 1232. However, in response to flash controller 124 determining at block 1218 that threshold T1 is satisfied, flash controller 124 marks the entire physical memory region containing the retired physical page as retired and thus unavailable for allocation to store new page stripes (block 1220). If the physical memory region for which retirement is determined at block 1218-1220 is a smaller region than an entire flash memory module, flash controller 124 may optionally determine whether or not to retire larger physical memory regions containing the retired physical page. It may also be determined that there are now too many retired memory resources within NAND flash memory system 120 to be able to achieve required performance levels, and flash controller 124 may send a response to the user indicating that it is time to replace the physical resource containing NAND flash memory system 140. The process then proceeds to block 1232.

At block 1230, flash controller 124 attempts to validate the data field 702 and LBA field 704 of the target data page by computing a cyclic redundancy code and comparing the computed CRC to that contained in CRC field 706. In response to successful validation of the data page, the process proceeds to block 1234, which is described below. However, in response to failure of the CRC validation at block 1230 or in connection with the processing described at blocks 1217, 1218 and/or 1220, flash controller 124 reads the entire page stripe and recovers the correct content of the target data page from the other data page(s) and the data protection page of the page stripe (block 1232). In addition, flash controller 124 moves the page stripe (including the recovered target data page) to a different physical location in NAND flash memory system 120 and invalidates the physical pages forming the old page stripe (if such pages are not retired). From block 1230 or block 1232, the process proceeds to block 1234, which illustrates flash controller 124 transmitting the target data page to the requesting host device, if the read was triggered by a read IOP. Thereafter, the process of FIG. 12 terminates at block 1240.

As noted above, the order of operations set forth in FIG. 12 is exemplary and embodiments are envisioned where the order of operations is different from that set out above. For example, embodiments are envisioned in which flash controller 124 transmits the data page to the host device prior to completing CRC validation and thereafter transmits an indication of whether the data page is valid or not. Also in some embodiments, the read IOP may access multiple data pages rather than a single data page.

Figure 13:
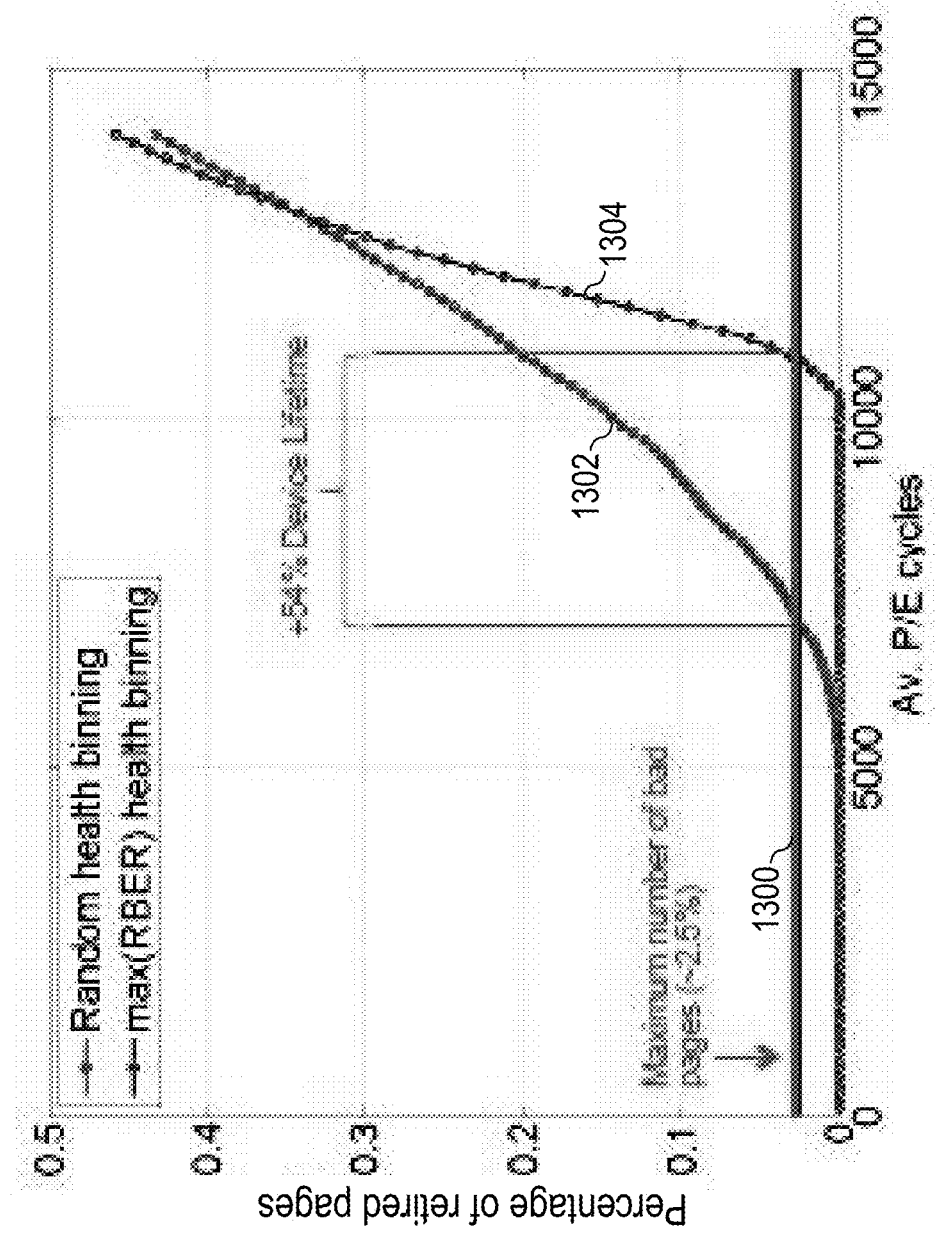
FIG. 13 is a graph illustrating the extension of useful life of a non-volatile memory system achieved by health grading.

FIG. 13 illustrates an extension of a useful life of a non-volatile memory array using health grading. In FIG. 13, the X axis represents the average number of program/erase cycles of blocks of physical memory in a NAND flash memory array, and the Y axis represents the percentage of pages of physical memory that have been retired from use by the flash controller.

As indicated in FIG. 13 by curve 1300, a flash memory array typically has a fixed threshold percentage of retired pages above which the flash memory array's performance degrades to a point that the flash memory array is replaced. In the example given in FIG. 13, this threshold percentage is set at approximately 2.5% of the total number of pages of physical memory; in other embodiments, the threshold percentage may be higher or lower based, for example, on the amount of overprovisioning and the performance requirements of the flash memory array, among other factors.

In FIG. 13 curve 1302 represents the percentage of retired pages in a NAND flash memory array if one type of conventional wear-leveling is employed, that is, if the flash controller keeps the number of program/erase cycles of each block approximately equal (i.e., a random distribution is employed). The following data is provided by way of example only for one particular illustrative NAND flash memory array; results for other NAND flash memory arrays as well as other NVRAM may vary based on a wide range of factors. As shown, when one type of conventional wear-leveling was employed, the number of retired pages crosses the threshold indicated by curve 1300 (rendering the NAND flash memory array unusable) at an average of approximately 7000 program/erase cycles. As indicated by curve 1304, the useful life of the same NAND flash memory array can be extended to an average of over 10000 program/erase cycles, an increase of more than 50%, if the flash memory controller instead allocates pages for programming based on health grades and access heat, as described herein. In the specific example given, the flash controller employed four health grades determined solely on the maximum (worst) residual bit error rate (RBER) of any page in each block of physical memory. The flash memory mapped LBAs falling within four heat bins to these four health grades using a direct correlation in which relative hotter addresses were mapped to healthier blocks and relatively colder addresses were mapped to less healthy blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As has been described, in at least one embodiment, a controller of a non-volatile memory array determines, for each of a plurality of regions of physical memory in the memory array, an associated health grade among a plurality of health grades and records the associated health grade. The controller also establishes a mapping of between access heat and the plurality of health grades. In response to a write request specifying an address, the controller selects a region of physical memory to service the write request from a pool of available regions of physical memory based on an access heat of the address and the mapping and writes data specified by the write request to the selected region of physical memory.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory propagating media per se.

In addition, although embodiments have been described that include use of a NAND flash memory, it should be appreciated that the inventions herein are not limited to use with NAND flash memory, but are instead applicable to any other non-volatile random access memory (NVRAM) technology. For example, the disclosed techniques may be applied to phase-change memory (PCM), magnetoresistive RAM (MRAM) and resistive RAM (RRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system including a non-volatile memory array controlled by a controller, the method comprising:
    for each region among a plurality of regions of physical memory in the memory array, the controller:
        determining at least one error metric for the region based on read errors generated by host read requests targeting the region that are received by the data storage system from an external host system and recording the at least one error metric for the region;
        determining, based on the at least one error metric for the region and based on a number of program/erase cycles for the region, an associated health grade among a plurality of health grades for the region and recording the associated health grade for the region;
    the controller establishing a mapping between access heat and the plurality of health grades;
    in response to a write request specifying an address, the controller selecting a selected region of physical memory to service the write request from a pool of available regions of physical memory based on an access heat of the address and the mapping; and
    the controller writing data specified by the write request to the selected region of physical memory.

2. The method of claim 1, and further comprising changing which health grade is associated with a particular region of physical memory based on a change of the at least one error metric for the particular region of physical memory.

3. The method of claim 1, and further comprising:
the controller determining and recording a heat of each of the plurality of regions of physical memory.

4. The method of claim 1, wherein establishing the mapping includes:
mapping greater access heat to health grades indicating greater health; and
mapping less access heat to health grades indicating less health.

5. A data storage system, comprising:
a controller configured to be coupled to a non-volatile memory array, wherein the controller determines for each region among a plurality of regions of physical memory in the memory array (1) at least one error metric for the region based on read errors generated by host read requests targeting the region that are received by the data storage system from an external host system and (2) an associated health grade among a plurality of health grades based on the at least one error metric for that region of physical memory and based on a number of program/erase cycles for that region, and records the at least one error metric and the associated health grade for each region, and wherein the controller establishes a mapping between access heat and the plurality of health grades and, in response to a write request specifying an address, selects a selected region of physical memory to service the write request from a pool of available regions of physical memory based on an access heat of the address and the mapping, and writes data specified by the write request to the selected region of physical memory.

6. The data storage system of claim 5, wherein the controller changes which health grade is associated with a particular region of physical memory based on a change of the at least one error metric for the particular region of physical memory.

7. The data storage system of claim 5, wherein the controller determines and records a heat of each of the plurality of regions of physical memory.

8. The data storage system of claim 5, wherein the mapping established by the controller maps greater access heat to health grades indicating greater health and maps less access heat to health grades indicating less health.

9. The data storage system of claim 5, and further comprising the non-volatile memory array coupled to the controller.

10. A program product, comprising:
a storage device; and
program code stored in the storage device, wherein the program code, when executed by a controller that controls a non-volatile memory array of a data storage system, causes the controller to perform:
for each region among a plurality of regions of physical memory in the memory array:
determining at least one error metric for the region based on read errors generated by host read requests targeting the region that are received by the data storage system from an external host system and recording the at least one error metric for the region;
determining, based on the at least one error metric for the region and based on a number of program/erase cycles for the region, an associated health grade among a plurality of health and recording the associated health grade for the region;
establishing a mapping between access heat and the plurality of health grades;
in response to a write request specifying an address, selecting a selected region of physical memory to service the write request from a pool of available regions of physical memory based on an access heat of the address and the mapping; and
writing data specified by the write request to the selected region of physical memory.

11. The program product of claim 10, wherein the program code further causes the controller to perform changing which health grade is associated with a particular region of physical memory based on a change of the at least one error metric for the particular region of physical memory.

12. The program product of claim 10, wherein the program code further causes the controller to perform:
determining and recording a heat of each of the plurality of regions of physical memory.

13. The program product of claim 10, wherein establishing the mapping includes:
mapping greater access heat to health grades indicating greater health; and
mapping less access heat to health grades indicating less health.

* * * * *